United States Patent [19]

Hall et al.

[11] Patent Number: 4,655,653

[45] Date of Patent: Apr. 7, 1987

[54] ROUTERS

[75] Inventors: Robert J. Hall, 400 E. Ohio, Apartment #3603, Chicago, Ill. 60611; Charles H. Karakis, Lincolnwood; Matt Kielek, Chicago, both of Ill.

[73] Assignee: Robert J. Hall, Chicago, Ill.

[21] Appl. No.: 652,001

[22] Filed: Sep. 19, 1984

[51] Int. Cl.[4] .................................................. B23C 1/20
[52] U.S. Cl. ...................................... 409/182; 409/185
[58] Field of Search ............... 409/182, 181, 175, 174, 409/185; 144/136 C, 134 D; 83/581, 745, 574

[56] References Cited

U.S. PATENT DOCUMENTS

| | | | |
|---|---|---|---|
| 1,532,683 | 4/1925 | Carter | 144/134 D |
| 3,207,193 | 9/1965 | Godfrey et al. | 144/134 D X |
| 3,893,372 | 7/1975 | Strakeljahn | 144/134 D X |
| 4,290,464 | 9/1981 | Marsan | 409/182 X |

OTHER PUBLICATIONS

Ryobi Power Tools catalog for 1984-1985, pp. 38-41.

*Primary Examiner*—James M. Meister
*Assistant Examiner*—John L. Knoble
*Attorney, Agent, or Firm*—Laff, Whitesel, Conte & Saret

[57] ABSTRACT

A router with a revolving spindle having a cutter on the end has a housing supported by a face plate. The face plate is coupled to the housing via a pair of articulated joints, which may be adjusted to a selected one of many possible angles relating the supporting plane of the face plate with the axis of the spindle. The face plate contains a relatively large hole through which the spindle projects with said cutter being positioned beyond the supporting plane, so that the cutter may be seen during normal operation. A protractor scale is engraved on at least one of the articulated joint parts to identify a cutting angle. In another embodiment, a plurality of click stops are provided on one of the articulated joint parts for accurately setting a selected one of several angles to which the joint may be moved.

8 Claims, 7 Drawing Figures

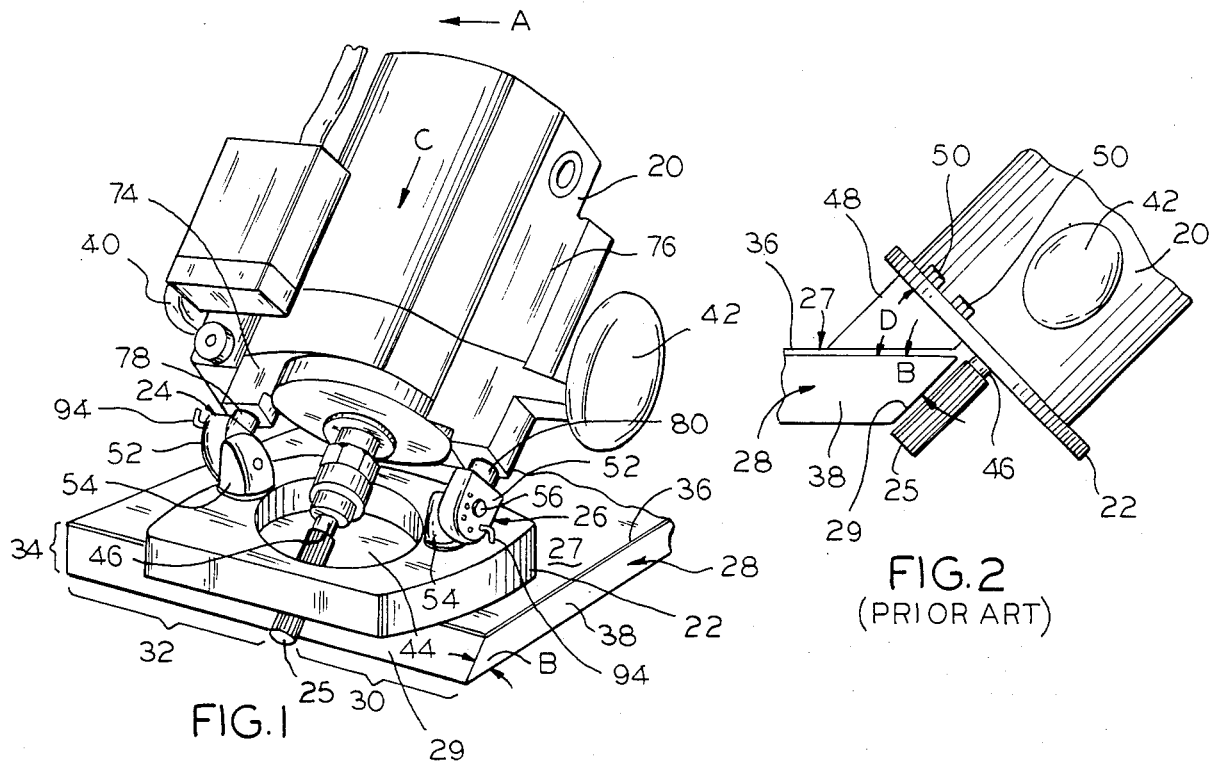
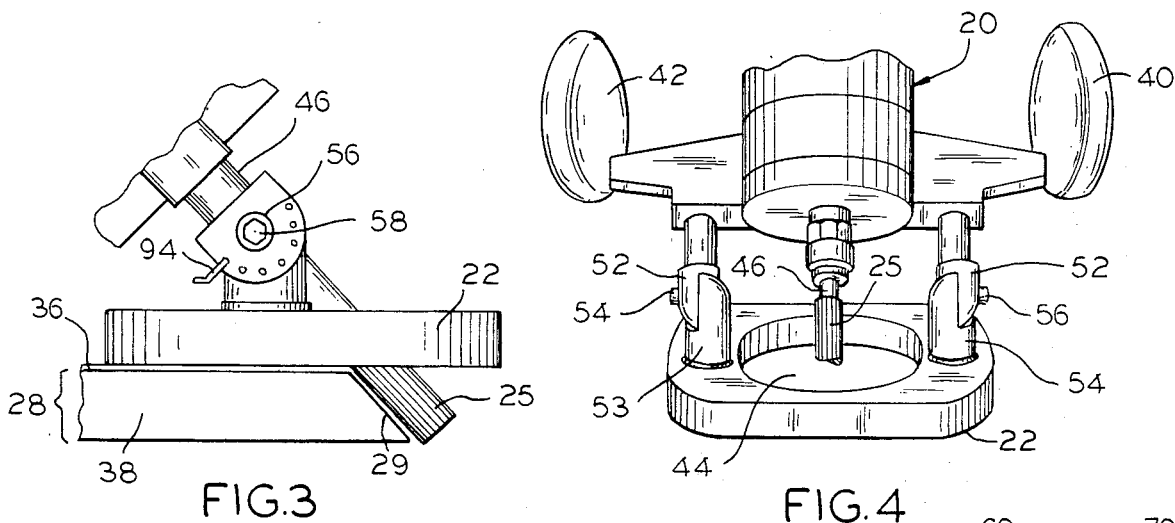
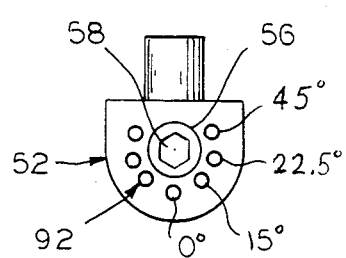
FIG. 3
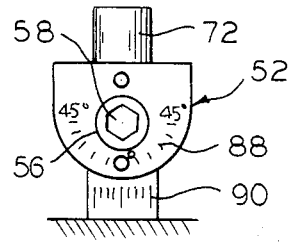
FIG. 6
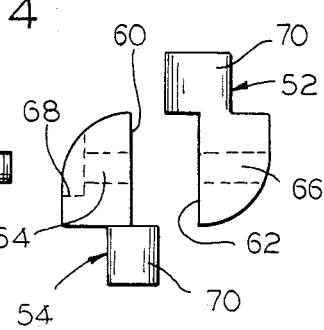

ROUTERS

This invention relates to routers and, more particularly, to routers having the capabilities of cutting a board (especially one with a laminated plastic surface) and for forming a kerf at any location on and at any of many angles relative to the surface of the board.

A router is a tool having a revolving shaft or spindle with a cutter on its end, usually for milling out a depression on a surface of a metal or wooden work piece. However, a router can also be used as a saw to cut all of the way through a work piece. Usually, a manually held router has two handles which a worker holds at waist level by a use of his two hands. When so held, the router is supported by a face piece which rests upon a surface of the work piece being milled or cut. In this position, the face piece surrounds the spindle, with the cutter projecting beyond the face piece. The housing of the router is immediately above the face plate; therefore, the cutter itself tends to be concealed from the worker's view. As a result, it is common practice to move the router along a path defined by a fence or other guides so that the router is travels along a preselected path, even though the cutter is hidden from the view of the worker.

Sometimes it may be possible for the worker to lean over and peek under the router housing to see the cutter; however, at best, his stooped posture would be most tiring to him. He may become so far off balance that continued use of the router could be dangerous and lead to accidents.

An example of a router used to saw a board might involve the making of a counter top, such as a kitchen counter top, from a plastic laminate bonded to three-quarter plywood. The laminant top is a very hard substance which cannot be easily cut by a conventional saw, which dulls very quickly. Also, the plastic chips tend to clog the cutting edge of the saw. Then, the wood might be torn, instead of being cut. This is why it is common practice to use a router with a specially designed carbide cutter to cut such a laminated material.

When it is necessary to cut the laminated board at a mitered angle which fits around a corner, the edge of the plywood and the plastic laminate bonded thereto are cut at some angle, such as 45° for a corner which turns at 90° or 22.5° for a corner which turns at 45°.

In the past, two procedures have been followed in order to use a router to make such a mitered cut. One procedure is to fashion an elongated block of wood with a wedge shaped cross section, tapering at the desired angle. Then, it is fastened to the bottom of the router face plate so that the entire router, and therefore, the cutter sets at the desired angle. This procedure has two disadvantages. Usually, the cutter under cuts, so that the top edge of the work piece which supports the router becomes very thin and tends to feather or chip. Also, the cutting is done blindly so that the worker has no idea as to how the cutting is proceeding until the cut is finished. The second disadvantage is that the center of gravity of the router is not over the work piece. Therefore, the worker has to use his muscle power to hold the router in place.

The second procedure for cutting such a mitered angle is to use a cutter with a specially designed profile that cuts at the desired angle when the router is held perpendicular to the work piece surface. This special purpose cutter is expensive and the cutting edge is also hidden from view.

Beyond all of these considerations, the various methods of angularly cutting the edge of a board which have been used heretofore, have all resulted in a clumsy tool that was difficult to use.

Accordingly, an object of the invention is to provide new and improved routers, especially routers to make mitered cuts.

Another object is to provide routers which may be set to cut at almost any desired angle.

Yet another object of the invention is to provide a tilt head router which exposes its cutting action to view during miter cuts. Here, an object is to provide a router for miter cutting a board having a plastic sheet laminated thereto.

Still another object of the invention is to provide a router which is stable while tilted and when used in a normal manner at waist height. Here, an object is to provide such a router which does not require stoop labor to see the cutter.

In keeping with an aspect of the invention, these and other objects are accomplished by providing a router having an articulated face plate. When the face plate is set at an angle relative to the cutter on the router, the proportions and weight distribution are such that the router's center of gravity always remains over the face plate. Therefore, the router rests in a very stable position without requiring any substantial muscle power to support it. Various indexing means are provided to more precisely set and control the angle of the face plate relative to the cutter. One of these indexing means selects any one of the three or four of the most commonly used angles with click stop precision. Another of the indexing means may be used to set an infinite variety of angles within two limits. A preferred embodiment of the invention is seen in the attached drawings wherein:

FIG. 1 is a perspective view of the inventive router with a face plate yet at an angle to make a bevelled or miter cut along an edge of a work piece;

FIG. 2 is a side view of a part of the router and its face plate which shows a prior art method of adjusting the miter angle of cut;

FIG. 3 is a side view which shows a similar fragment of the inventive router and a cutter using the inventive method of making the angle of cut;

FIG. 4 is a front elevation of a similar fragment of the inventive router;

FIG. 5 is an exploded view of the parts used to make the joint which articulates the position of the face plate;

FIG. 6 is a side elevation of the articulated joint with a protractor scale which may be used to select any desired one of an infinite number of angles; and FIG. 7 is a similar side elevation of the articulated joint with discrete indexing positions which always produce the same angle with click stop accuracy.

FIG. 1 shows a router 20 having a body mounted on a face plate 22 by means of two articulated joints 24, 26. A cutter 25 is mounted on the end of a revolving shaft or spindle in the router, in order to cut or mill a work piece which is supporting face plate 22. The router 20 is shown in FIG. 1 while it is being moved in a direction A with the supporting plane of its face plate 22 resting on the upper surface 27 of work piece 28. At the instant shown in FIG. 1, the router 20 has already moved over a distance 30, while it is cutting the edge 29 of the work piece 28 at an angle B, which may be 45° for example.

The uncut portion 32 has an edge 34 which is, perhaps, perpendicular to the surface 27.

In this particular work piece, the upper portion 36 of the work piece is a plastic laminate. The lower portion 38 is a piece of plywood which is three-quarter inches thick. Of course, any other suitable form of work pieces may also be cut.

The worker normally holds the router by two handles 40, 42 positioned on opposite sides thereof. When he holds the router at waist height, the worker has the greatest stability and the least fatigue. Therefore, it is highly undesirable to force him to lean over the tool to watch the cutter in action, to hold the router at some other level, or to support the router by his muscle power. If it should be necessary for him to keep his muscles in tension, they will tend to tire quickly, to quivver, and to lead to uneven or jagged cutting.

The face plate 22 contains a relatively large hole 44 for the spindle 46 to pass through. Therefore, if the worker is standing behind the router 20 (as it is viewed in FIG. 1), it is easy for him to look down in direction C, along the router housing, and into the hole 44. If the worker is standing in front of the router 20 (as it is viewed in FIG. 1), he is looking directly into the hole 44 and at the cutter 25. Either way, it is easy for the worker to see what the cutter 25 at the end of spindle 46 is doing.

The diameter or outside dimensions of the face plate 22, and the dimensions and distribution of the weight of router 20, are such that its center of gravity always rests over the face plate during normal use, and while the router is being supported by the face plate in a plane defined by its bottom surface. Therefore, the router is very stable when in use. This means that the worker only has to guide the router, as distinguished from holding it in a manner which supports its weight. Hence, an edge may be cut very precisely and without the unevenness which would likely result if the worker must forcibly hold the router on the surface and against the pull of gravity.

An object of the invention is to enable the edge 29 of the work piece 28 to be cut at any selected angle B relative to the surface 27. Heretofore, the most common way of making this angular cut is shown in FIG. 2. The worker first calculated the angle B that he wants to cut at the edge 29. Then, he finds the angle D, which is a complement of the angle B of cut edge 29. Next, he forms a wedge shaped block of wood 48 which is cut to angle D and is bolted at 50, 50 to the face piece 22 of the router. For the wedge 48 to be stable, it must be relatively long in the dimension parallel to edge 29 (perpendicular to the plane of FIG. 2). Perhaps, the block may be as long as or longer than the face plate itself. The wedge conceals from view the otherwise visible part of hole 44 and the entire cutter 25 at the end of spindle 46. Therefore, the worker has no idea of how the work is progressing at the time when the cut is being made.

It should be noted from FIG. 2 that the cutter 25 is extending beneath the upper surface 27 of the work piece 28. Thus, it would be impossible to cut a kerf through the middle of a large sheet because half of the face plate 22 is lower than the upper surface 27. There is no way of seeing the quality of the cut along edge 29 since it is being cut below surface 27. The weight of the router 20 is being supported by the muscles of the worker because the router's center of gravity is not over work piece 28. The worker in turn, has to push block 48 downwardly against surface 27 in the vicinity of the thinnest edge and, therefore, the weakest part of the work piece 28. Any small amount of vibration and chatter or instability will very likely result in chipping along the edge at the apex of angle B. Since the router's center of gravity is not over the supporting work piece surface, and since the worker always has to press the block of wood 48 against surface 27, vibrations and chattering which are caused by tired and tense muscles will almost certainly occur.

In keeping with an aspect of the invention, the face plate 22 is connected to the router 20 by means of a pair of articulated joints 24, 26. Each of these joints (FIG. 5) includes two parts 52, 54 and a bolt 56 having a head with a counter-sunk Allen wrench socket 58 formed therein. The parts 52, 54 have confronting planar surfaces 60, 62 which come together in face-to-face contact with the bolt 56 passing through aligned holes 64, 66 in the parts 52, 54. The face-to-face surfaces must have sufficient bearing surface area to provide a strong clamping action to secure the face plate at the desired angle. For most uses the surface should be no less than one inch diameter at the bearing surface. The hole 64 is recessed at 68 to provide a good seat for the head of the bolt 56. The hole 64 is not threaded so that an unthreaded part of the bolt 56 may turn freely in it. The hole 66 is threaded to act as a nut for the threaded end of bolt 56. Thus, the bolt 56 may be drawn tightly enough to pull the parts 52, 54 together and into a secure friction fit.

Compare the prior art (FIG. 2) with the invention (FIG. 3). The face plate 72 is directly under the inventive router (FIG. 3) which has a center of gravity falling within the perimeter of the area supported by the face plate. The weight of the router is supported by the work piece and not by the muscles of the worker. The work piece remains stable and does not shake. The support by the work piece means that the muscles of the worker 20 are not as tense; thus, he is less prone to become tired and to shake the cutting tool. Also, the cutter 25 is out in front of (not behind or under) the edge 29 which is being cut. The evenness of the cut is exposed to view as the cutting occurs. In FIG. 3, the weight of the router is resting on the full thickness of the work piece 28 and not on the thinness part, as in the prior art FIG. 2. As a result of this arrangement, there is much less chance for the edge to chip at the apex of angle B.

Each of the articulated joints has two opposing mounting posts 70, 72 which fit into holes in the face plate and in the router housing, respectively. These posts may be secured in place in any suitable manner, such as by a threaded interconnection, brazing, welding, press fit, or the like. In one preferred embodiment, they are held in place by a press fit and the alignment is secured by a roll pin, which is a pin having radial spring-like qualities along its longitudinal direction. The roll pin passes through aligned holes (not shown) in the posts, the face plate, and the router housing. These holes are perpendicular to the axis of posts 70, 72. An advantage is that the alignment will not shift due to vibration as the tool is used. Moreover the pin would prevent vibrations which lead to user fatigue.

Certain routers (called "plunge routers") may be adjusted to cut at different depths. For example, in FIG. 1, housing 20 includes spaced parallel guideways 74, 76 on opposite sides of the housing 20. A pair of mounting pipes or rods 78, 80, attached to face plate 22, telescopingly slide in these guideways 74, 76. Therefore, by extending or retracting pipes or rods 78, 80, the face plate 22 may be positioned at any of many different distances from the router in order to vary the cutting depth.

When plunging routers are used and the supports 78, 80 are pipes, the posts 72 on each of the articulating joints may be pressed into the end of the pipes 78, 80 where they are roll pinned into place.

FIG. 6 illustrates a method of indexing cutting angle B to any of an infinite number of angles. A protractor scale 88 is engraved on one of the parts 52. An indicator or scale 90 may be formed on either the face plate or the other part 54 of the joint, in order to identify the cutting angle B, which is set between the two parts. Of course, the indicator 90 may also be associated with the position of the housing 20 and the protractor may be associated with the position of the face plate 22.

In one embodiment, the two scales 88, 90 may have a vernier relationship. The numbers on scale 88 may be selected to directly read out the set of the desired angle B so that there is no need to calculate and use the complement as is done when the prior art wedge 48 (FIG. 2) is used. This protractor scale enables the worker to select any of an infinite number of angles, after which bolt 56 is tightened to lock the parts 52, 54 into place.

With the embodiment of FIG. 7, either pin 94 or a spring biased detent may be used to select the angle, with a click stop precision. In greater detail, the part 52 has a number of holes (such as 92) drilled or otherwise formed in a circular pattern centered on the axis of rotation formed by bolt 56. The other part 54 of the joint has a single hole formed therein at a position which may confront any one of the holes 92, as the joint articulates. Accordingly, the face plate 22 is moved to select any one of several discrete angles at which point, one of the holes 92 and the confronting hole in part 54 are in alignment. Thereafter, the pin 94 (FIG. 3) is passed through the aligned holes. Then the bolt 58 is tightened. In another embodiment, the confronting hole in part 54 may contain a spring loaded detent (not shown) which may fit into one of the holes 92 depending upon the angular offset of the face plate 22. That detent also indexes the selected angular offset of the joint.

Those who are skilled in the art will readily perceive how to modify the invention. Therefore, the appended claims are to be construed to cover all equivalent structures which fall within the true scope and spirit of the invention.

THE CLAIMED INVENTION IS:

1. A router having a housing with a top and a bottom, said housing including a pair of spaced parallel guideways, a shaft telescopingly received in each of said guideways, a revolving spindle with a cutter on the end, said spindle being located at the bottom of the housing, a face plate associated with the bottom of said housing for defining a plane for supporting said housing, means for coupling said face plate to said housing via a pair of articulated joints, each of said articulated joints including two parts with confronting planes which come together in a face-to-face relationship and a pin means passing through said parts to lock them in selected positions, each of said two joint parts also includes a mounting post, means for mounting one of said posts on said face plate, means for mounting the other of said parts on said housing with said pins of said two joints in axial alignment, said posts which are mounted on said housing being secured to the bottoms of said telescoping shafts, whereby the distance between said face plate and said housing may be adjusted independently of said selection of said angle, means for adjusting the articulated joints to a selected one of many possible angles relating the supporting plane of said face plate with the axis of said spindle, at least one of the possible selected angles being with said spindle extending perpendicular through said face plate and said supporting plane, and means associated with said articulated joints to preserve said selectd angle during a use of said router, said face plate containing a relatively large hole through which said spindle projects with said cutter being positioned beyond said supporting plane, said large hole being positioned so that said cutter lies in a line of sight passing from above the top of said housing, along said housing, and through said large hole so that said cutter may be seen by the operator of the router when at least one of said selected angles is larger than said perpendicular.

2. The router of claim 1 and indicator means comprising a protractor scale engraved on at least one of said articulated joint parts for identifying an angle to which said joint has been set.

3. The router of claim 2 and a second scale associated with the other of said joint parts for cooperating with said indicator means to identify said set angle, said scales having a vernier relationship.

4. The router of claim 1 and indicator means comprising a plurality of click stops on at least one of said articulated joint parts for identifying a specific one of several angles to which said joint may be moved.

5. The router of claim 4 wherein said click stop means comprise a plurality of holes formed in a circular pattern on one of said parts with a confronting hole formed in the other of said parts whereby a pin may be passed through aligned holes in said two parts.

6. The router of claim 1 herein said many angles lie in a single plane and include an infinite number of angles extending between two limits.

7. The router of claim 6 wherein said two limits are substantially 45° on opposite sides of said perpendicular.

8. The router of claim 6 wherein said infinite number of angles include at least, 15°, 22.5°, and 45°, taken relative to said perpendicular.

* * * * *